United States Patent
Hung et al.

(10) Patent No.: US 10,964,123 B2
(45) Date of Patent: Mar. 30, 2021

(54) INSOLE DESIGN METHOD AND INSOLE DESIGN SYSTEM

(71) Applicant: Industrial Technology Research Institute, Hsinchu (TW)

(72) Inventors: Yu-Lung Hung, Miaoli County (TW); Po-Fu Yen, New Taipei (TW); Zhong-Yi Haung, Changhua County (TW); Kang Chou Lin, Hsinchu County (TW); Shang-Yi Lin, Taichung (TW); Chia-Chen Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 68 days.

(21) Appl. No.: 16/541,050

(22) Filed: Aug. 14, 2019

(65) Prior Publication Data
US 2020/0168004 A1    May 28, 2020

(30) Foreign Application Priority Data
Nov. 23, 2018   (TW) ................. 107141808

(51) Int. Cl.
G06T 19/20         (2011.01)
G06T 7/50          (2017.01)
G06T 15/00         (2011.01)

(52) U.S. Cl.
CPC ........... *G06T 19/20* (2013.01); *G06T 7/50* (2017.01); *G06T 15/00* (2013.01); *G06T 2207/10028* (2013.01); *G06T 2219/2016* (2013.01)

(58) Field of Classification Search
CPC ......... G06T 7/0016; G06T 7/50; G06T 15/00; G06T 17/00; G06T 19/20; G06T 2200/04;
(Continued)

(56) References Cited

U.S. PATENT DOCUMENTS 9,460,557 B1   10/2016   Tran et al.
9,836,883 B2   12/2017   Tran et al.
(Continued)

FOREIGN PATENT DOCUMENTS

CN   103300546 A   9/2013
CN   102793542 B   11/2014
(Continued)

OTHER PUBLICATIONS

Huang, Chung-Neng, Ming-Yih Lee, and Chong-Ching Chang. "Computer-aided design and manufacturing of customized insoles." IEEE computer graphics and applications 31.2 (2011): 74-79. (Year: 2011).*

*Primary Examiner* — Sae Won Yoon (57) ABSTRACT

An insole design method and an insole design system are provided, and the method includes: capturing an uncompressed free foot model by a depth camera and obtaining a free foot model three-dimensional image; capturing a pressed foot model stepped on a transparent pedal by the depth camera and obtaining a pressed foot model three-dimensional image; aligning the free foot model three-dimensional image with the pressed foot model three-dimensional image; calculating and obtaining a plantar deformation quantity according to the aligned free foot model three-dimensional image and the aligned pressed foot model three-dimensional image; and completing the designed insole according to a sole projection plane or a three-dimensional profile of the specific sole and the plantar deformation quantity.

16 Claims, 7 Drawing Sheets

(58) Field of Classification Search
CPC . G06T 2207/10016; G06T 2207/10028; G06T 2207/30088; G06T 2219/2016
USPC ........................................................ 345/419
See application file for complete search history.

(56) References Cited

U.S. PATENT DOCUMENTS

2017/0105490 A1\* 4/2017 Makover .............. A43B 3/0005
2017/0169571 A1 6/2017 Hung et al.
2017/0255185 A1 9/2017 Hinshaw

FOREIGN PATENT DOCUMENTS

| | | |
|---|---|---|
| CN | 106204727 A | 12/2016 |
| CN | 106273498 A | 1/2017 |
| TW | I259382 | 8/2006 |
| TW | 200948296 A | 12/2009 |
| TW | 201010766 A | 3/2010 |
| TW | M509373 U | 9/2015 |
| TW | I543109 | 7/2016 |
| WO | WO2017151579 | 9/2017 |

\* cited by examiner

INSOLE DESIGN METHOD AND INSOLE DESIGN SYSTEM

CROSS-REFERENCE TO RELATED APPLICATION

This application claims the priority benefits of Taiwan application serial no. 107141808, filed on Nov. 23, 2018. The entirety of the above-mentioned patent application is hereby incorporated by reference herein and made a part of this specification.

TECHNICAL FIELD

The present disclosure relates to a system and method for designing product, further relates to an insole design method and an insole design system.

BACKGROUND

Conventionally, the customized design insole needs the three-dimensional data of foot type and the foot pressure data for design reference. In terms of equipment, besides a three-dimensional scanner, it also needs a foot pressure machine, then can obtain the above mentioned data. In addition, if it takes the foot pressure data for assisting in the design of the insole, it will needs artificial professional judgment and it is difficult to quantify the part that needs to be adjusted. Thus, it is time-consuming and labor-intensive for the insole technician Therefore, how to design an insole to fit the individual's needs with the foot shape becomes one of the problems to be solved in the field.

SUMMARY

In order to solve the problems mentioned above, the embodiment according to the present disclosure provides an insole design method and an insole design system.

The insole design method comprising capturing an uncompressed free foot model by a depth camera and obtaining a free foot model three-dimensional image; capturing a pressed foot model stepped on a transparent pedal by the depth camera and obtaining a pressed foot model three-dimensional image; aligning the free foot model three-dimensional image with the pressed foot model three-dimensional image; calculating and obtaining a plantar deformation quantity according to the aligned free foot model three-dimensional image and the aligned pressed foot model three-dimensional image; and completing the designed insole according to a sole projection plane or a three-dimensional profile of the specific sole and the plantar deformation quantity.

The insole design system comprises a depth camera and a processor. The depth camera configured to capture an uncompressed free foot model to obtain a free foot model three-dimensional image and capture a pressed foot model stepped on a transparent pedal to obtain a pressed foot model three-dimensional image. The processor configured to align the free foot model three-dimensional image with the pressed foot model three-dimensional image, and obtains a plantar deformation quantity according to the aligned free foot model three-dimensional image and the aligned pressed foot model three-dimensional image, then completes a designed insole according to a sole projection plane or a three-dimensional profile of the specific sole and the plantar deformation quantity Several exemplary embodiments accompanied with figures are described in detail below to further describe the disclosure in details.

DESCRIPTION OF EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
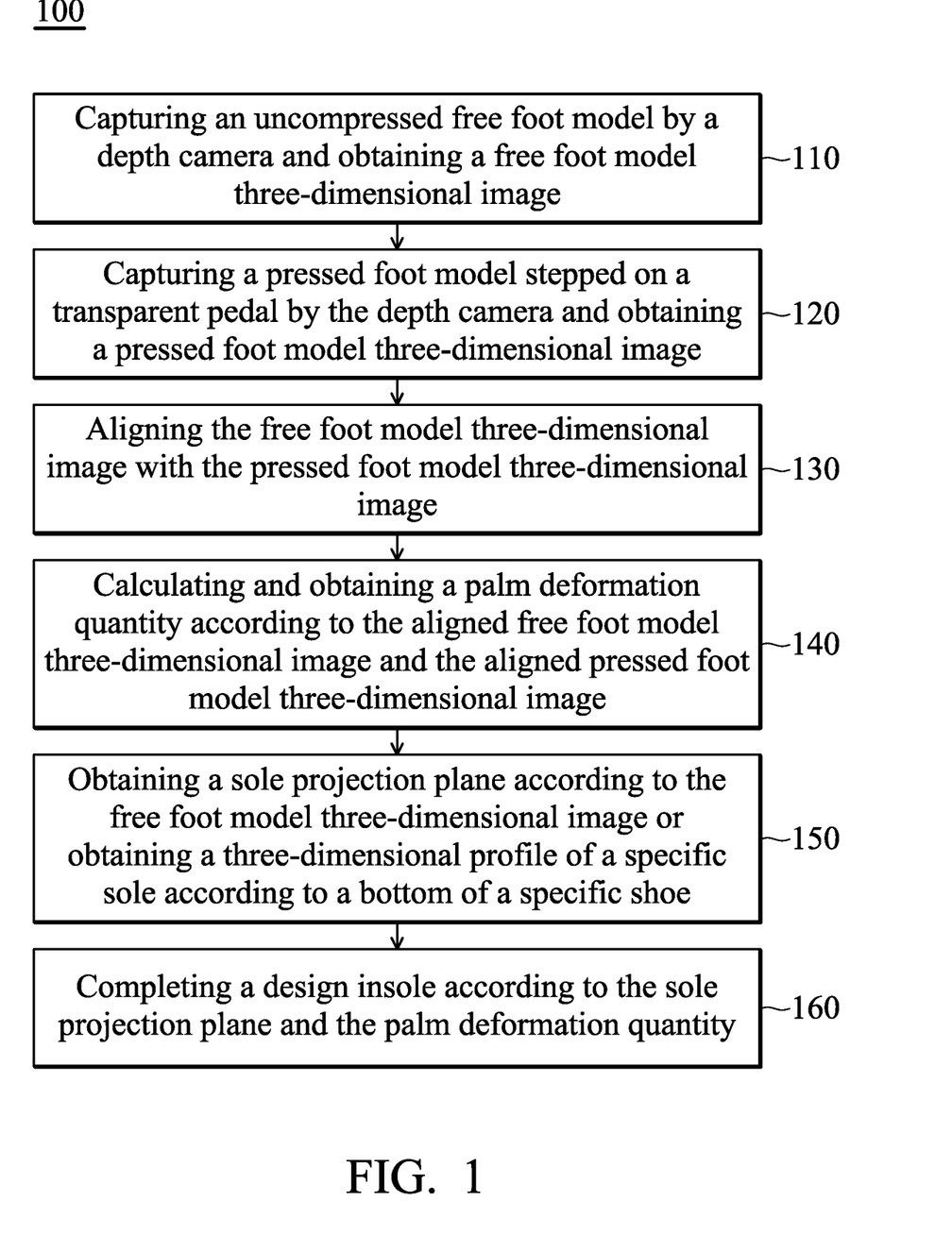
FIG. 1 is a flow chart illustrating an insole design method according to an embodiment of the disclosure.
Figure 2:
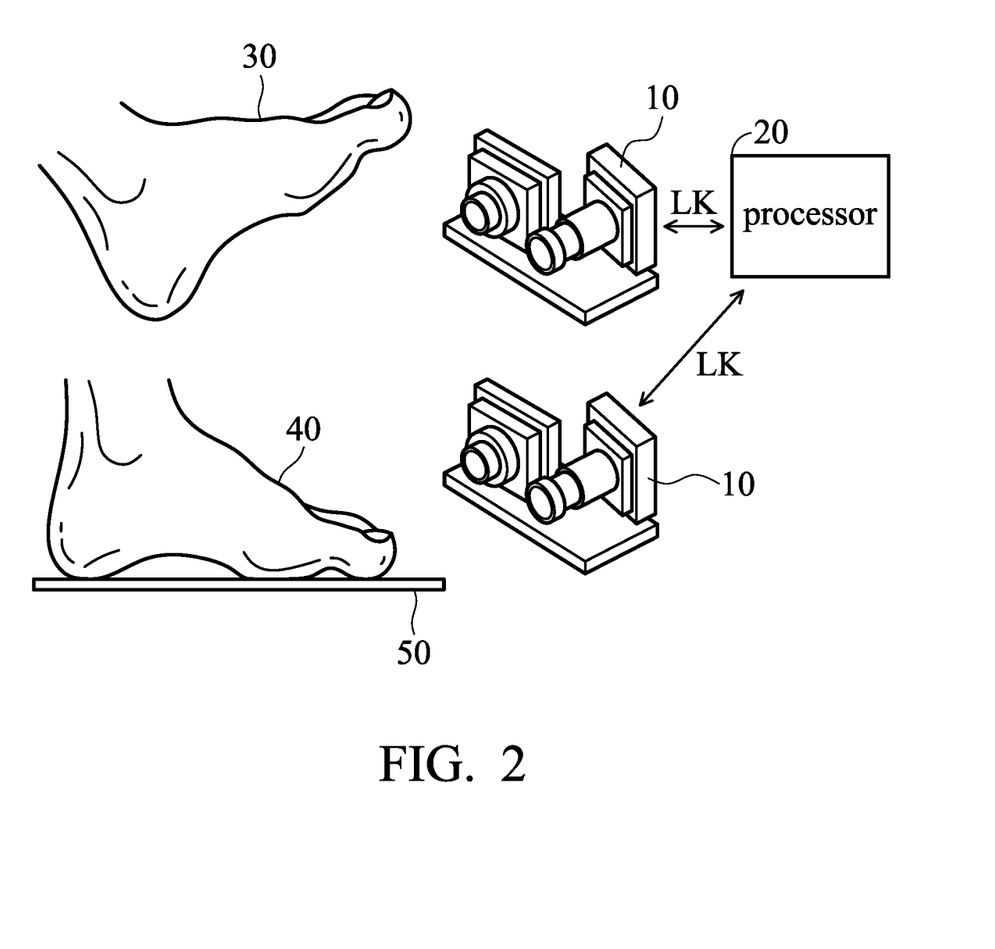
FIG. 2 is a schematic diagram illustrating capturing foot models according to an embodiment of the disclosure.

Please refer to FIG. 1 and FIG. 2. FIG. 1 is a flow chart illustrating an insole design method according to an embodiment of the disclosure. FIG. 2 is a schematic diagram illustrating capturing foot models according to an embodiment of the disclosure.

In step 110, a depth camera 10 captures an uncompressed free foot model 30 and obtains a free foot model three-dimensional image. In one embodiment, the uncompressed free foot model 30 is the foot shape without pressure.

In step 120, the depth camera 10 captures a pressed foot model 40 stepped on a transparent pedal to obtain a pressed foot model three-dimensional image. In one embodiment, the pressed foot model 40 is the foot shape with pressure. For example, when the feet stand on the transparent pedal 50, the sole of the feet will withstand the pressure from the body or legs, and make the shape of the sole to deform.

In one embodiment, the step 110 and the step 120 can swap. In one embodiment, it can apply a three-dimensional scanner with full view is 720 degrees, such as plurality depth cameras, or adapting plurality depth camera 10 with different specification to capture various locations of foot, and constructing the information of the foot model.

In one embodiment, the depth camera 10 connects to the processor 20 through the communication LK by wire or wireless way, and the depth camera 10 transmits the captured image to the processor 20.

In step 130, the processor 20 aligns the free foot model three-dimensional image and the pressed foot model three-dimensional image.

Figure 3A:
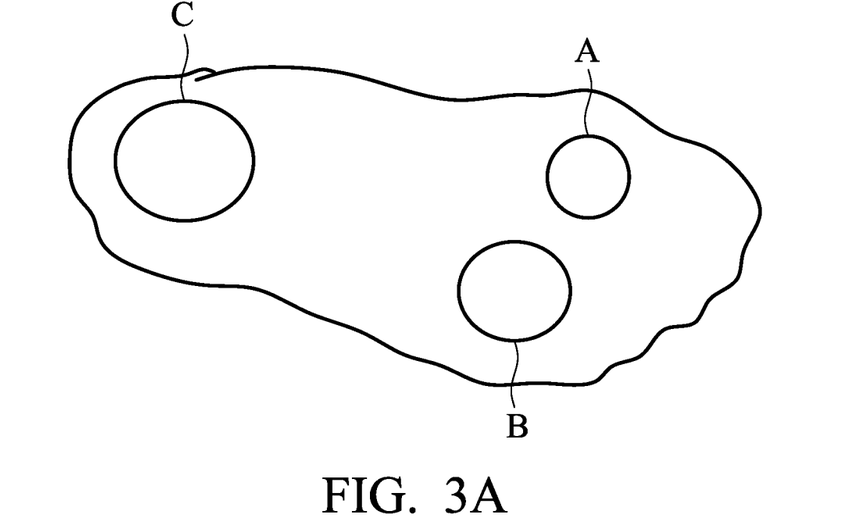
FIG. 3A is a schematic diagram illustrating choosing three non-collinear points according to an embodiment of the disclosure.
Figure 3B:
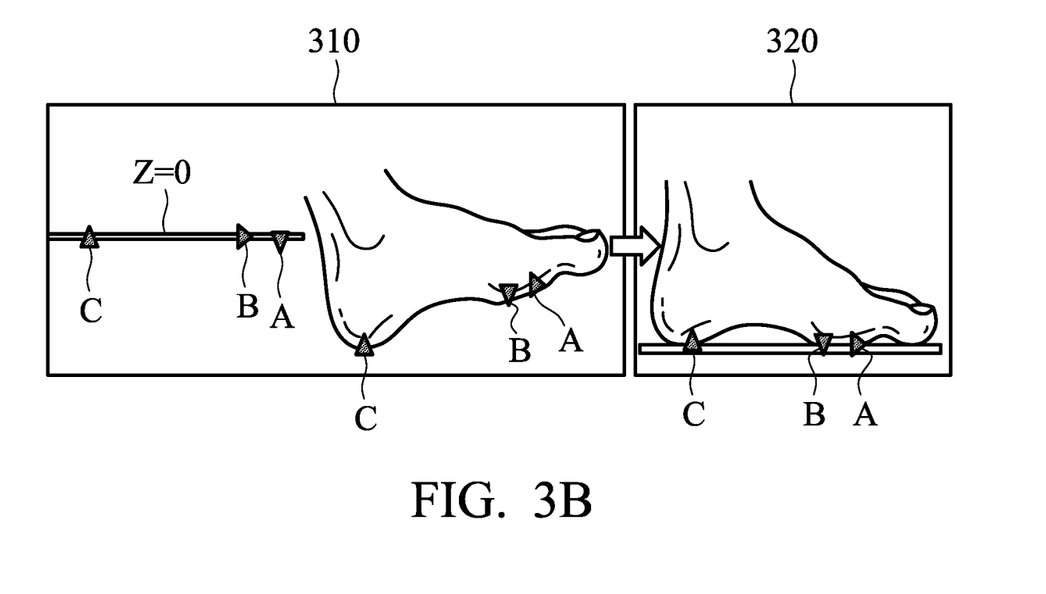
FIG. 3B is a schematic diagram illustrating producing an aligned free foot model three-dimensional image according to an embodiment of the present disclosure.
Figure 4:
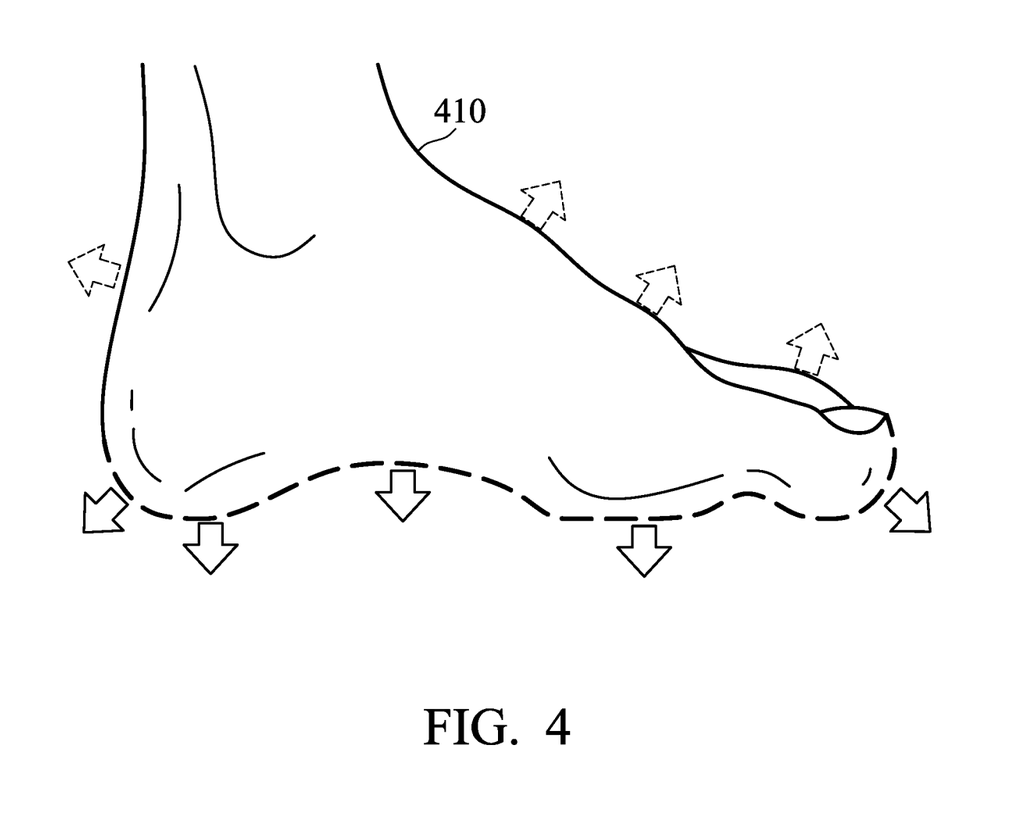
FIG. 4 is a schematic diagram illustrating defining the dorsum pedis and the sole according to an embodiment of the present disclosure.

Please refer to FIGS. 3A, 3B and 4, FIG. 3A is a schematic diagram illustrating choosing three non-collinear points according to an embodiment of the disclosure. FIG. 3B is a schematic diagram illustrating producing an aligned free foot model three-dimensional image according to an embodiment of the present disclosure. FIG. 4 is a schematic diagram illustrating defining the dorsum pedis and the sole according to an embodiment of the present disclosure.

As shown in FIG. 3A, in this embodiment, the processor 20 chooses three non-collinear points A~C from the pressed area of the pressed foot model three-dimensional image, wherein the three non-collinear points A~C construct a plane. Then, the processor 20 rotates or moves the three non-collinear points A~C to a plane which its z axis is equal to zero.

As shown in FIG. 3B, the processor 20 further rotates or moves the free foot model three-dimensional image 310 to a plane which its z axis is equal to zero, wherein the look of the free foot model three-dimensional image 310 is not change, only rotates or shifts the free foot model three-dimensional image, to produce an aligned free foot model three-dimensional image 320.

Thus, producing the aligned free foot model three-dimensional image 320 by defining the sole of the free foot model three-dimensional image 310 to the plane which its z axis is equal to zero, in order to align with the aligned pressed foot model three-dimensional image 410 stepped on a plane.

In one embodiment, the processor 20 aligns the area of dorsum pedis of the aligned free foot model three-dimensional image with the area of dorsum pedis of the aligned pressed foot model three-dimensional image.

In one embodiment, the step of aligning the area of dorsum pedis of the aligned free foot model three-dimensional image with the area of dorsum pedis of the aligned pressed foot model three-dimensional image by the processor 20 can apply the rigid or non-rigid registration method, such as Iterative Closet Point、Robust Point Match、Kernel Correlation、Coherent Coint Drift and Sorting the Correspondence Space algorithms to obtain a best solution.

In one embodiment, when the feet stand on the transparent pedal 50, the sole of the feet will withstand the pressure from the body or legs, and make the shape of the sole to deform, but the deformation quantity of the dorsum pedis of the feet is not obvious. Therefore, the dorsum pedis of the aligned free foot model three-dimensional image 320 (FIG. 3B) and the dorsum pedis of the aligned pressed foot model three-dimensional image 410 (FIG. 4) are the same or very similar. Thus, the processor 20 can align the above mentioned three-dimensional images according to the dorsum pedis portion to obtain the difference of the sole shape between the free foot model three-dimensional image 320 (FIG. 3B) and the pressed foot model three-dimensional image 320 (FIG. 3B).

More specifically, as shown in FIG. 4, it can define the sole portion and the dorsum pedis portion according to the positive and negative signs of the normal vector of the triangular grid of three-dimensional information corresponding to each part of the appearance outline of the aligned pressed foot model three-dimensional image 410. The positive and negative signs of the normal vector can be defined by the inner product of the normal vector of the aligned plane which its normal vector is (0,0,1) and the normal vector of each triangular grid. From the inner product of each portion of the foot model can obtain the angle between each portion of foot model and the aligned plane, and defines the value of the cosine of angle larger than zero as the dorsum pedis portion, the value of the cosine of angle less than zero as the sole portion. Thus, as shown in FIG. 4, the portions with the value of the cosine of angle larger than zero are presented by the dotted arrows, and defining as the dorsum pedis. The portions with the value of the cosine of angle less than zero are presented by the solid arrows, and defining as the sole. Similarly, it can use the same way to define the dorsum pedis portion and the sole portion of the aligned free foot model three-dimensional image 320.

Therefore, the aligned free foot model three-dimensional image 320 (FIG. 3B) and the aligned pressed foot model three-dimensional image 410 (FIG. 4) can be aligned by aligning the three-dimensional image of the above two, and then obtains the variation of the plantar shape of the above two.

In step 140, the processor 20 calculates and obtains a plantar deformation quantity according to the aligned free foot model three-dimensional image 320 and the aligned pressed foot model three-dimensional image 410.

Figure 5:
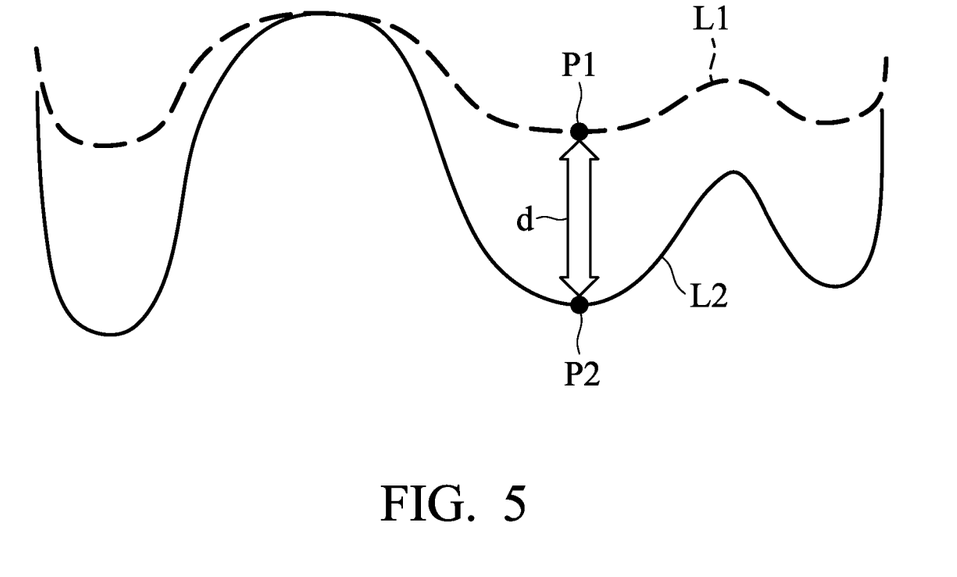
FIG. 5 is a schematic diagram illustrating the plantar deformation according to an embodiment of the present disclosure.

Please referring to FIG. 5, FIG. 5 is a schematic diagram illustrating the plantar deformation according to an embodiment of the present disclosure. For convenient to describe, FIG. 5 only shows part of side-view lines of soles of the free foot model three-dimensional image 320 and the pressed foot model three-dimensional image 410. The plantar portion of the free foot model three-dimensional image 320 is line L2, and the plantar portion of the pressed foot model three-dimensional image 410 is line L1. The difference (or variation) between lines L1 and L2 is the deformation quantity, such as a plantar deformation quantity.

Figure 6:
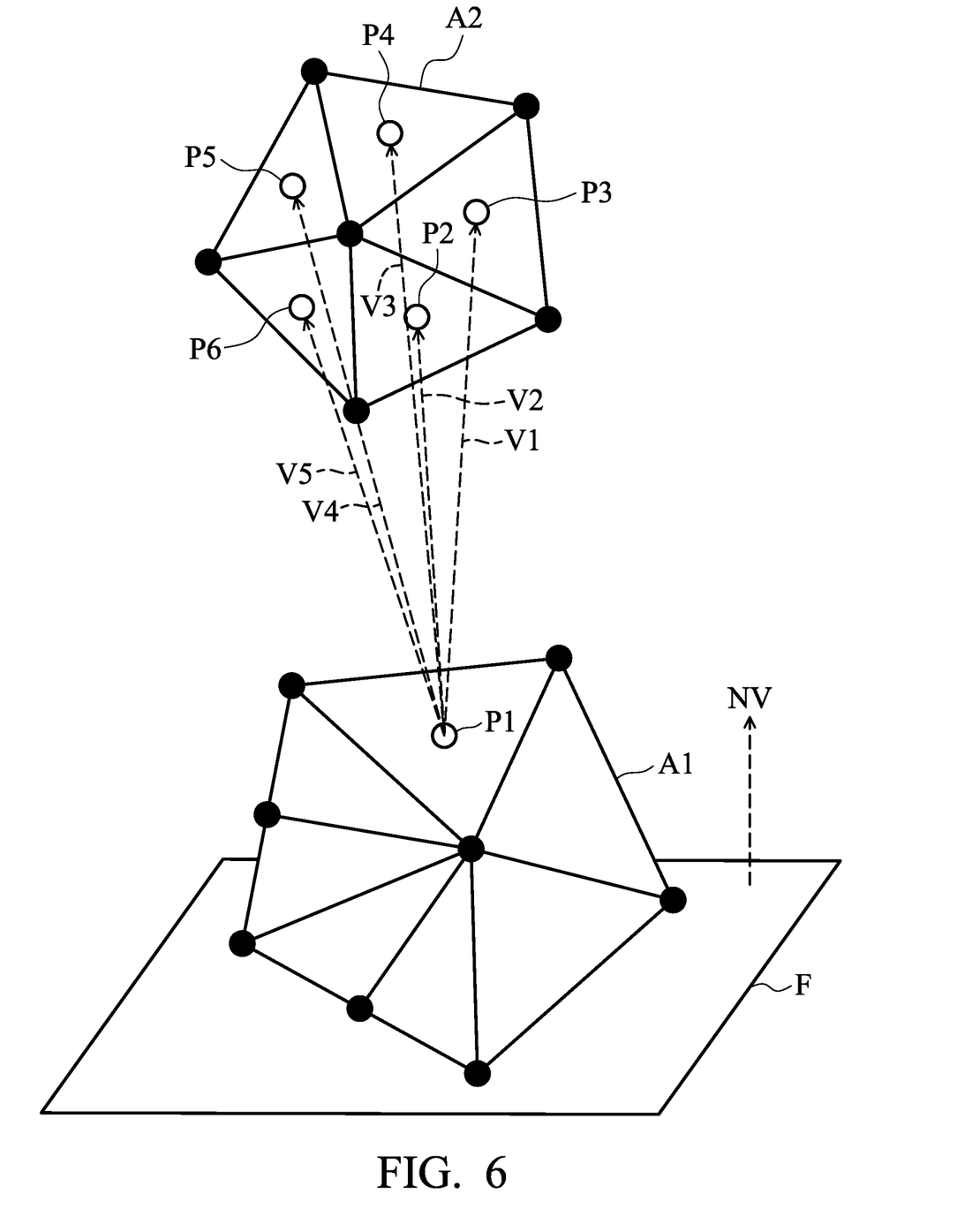
FIG. 6 is schematic diagram illustrating the calculating method of the deformation quantity according to an embodiment of the present disclosure.

In one embodiment, please referring to FIG. 5 and FIG. 6, FIG. 6 is schematic diagram illustrating the calculating method of the deformation quantity according to an embodiment of the present disclosure. Here, the deformation quantity corresponds to a point, such as a plantar deformation quantity d. More specifically speaking, the free foot model three-dimensional image 320 and the pressed foot model three-dimensional image 410 are each composed from many small triangular grids. Through triangular girds to compare the vertical distance between specific points P2~P6 in the free foot model three-dimensional image 320 and the pressed foot model three-dimensional image 410 can calculate the deformation quantity of the specific point, which means the vertical variation in the Z-axis direction. The vertical distance for example is the distance between the specific point P1 of the line L1 and the specific point P2 of the line L2. The way to calculate the vertical distance for example is to take a specific point P1 in the center of the specific triangular grid in a plane A1, and checking if there is an intersection with all of triangular grids of a plane A2 along the normal vector NV (0,0,1) of a stepping plane F. Finding the only specific point P2 is intersected in one of the triangular grids. Then the distance between the specific point P1 and the specific point P2 is the solution based on the normal vector NV of the stepping plane F, which means the vertical distance between the specific point P1 and the plane A2. For example, as shown in FIG. 6, the normal vector NV (0,0,1) of the plane F (XY-plane) and the specific point P1 can construct a parametric equation to find solutions from each triangular grids in the plane A2. But only a triangular grid can make the solution of the parametric equation (specific point P2) fall inside the triangular grid. Then the solution of the parametric equation (specific point P2) is taken as the vertical distance between the specific point P1 and the plane A2. Thus, the length of the normal vector V2 can be seen as the plantar deformation quantity d.

In one embodiment of the disclosure, the processor 20 can adjust a material of the designed insole according to the plantar deformation quantity. For example, when designing an insole, varying the structure or the material of each position of the designed insole according to the plantar deformation quantity. The plantar deformation quantity can be corresponding to the hardness degree of each position of the designed insole.

In one embodiment of the disclosure, the insole could have a buffer layer. For example, the buffer layer can be disposed on the most upper layer or the relatively upper layer. Reference to the positions of the sole having more deformation quantity when pressing, the structure of the buffer layer corresponding to the above mentioned positions can be designed more soft, which make the person wears the shoes feel more comfortable. In one embodiment, the processor 20 adjusts a thickness of the buffer layer according to the plantar deformation quantity. The processor 20 can also adjust the thickness of the buffer layer proportionally or by adding a fixed value of the whole buffer layer to produce various 3D deformations according to the plantar deformation quantity. Or adjusting the thickness, such as adding 1 mm to 2 mm of the thickness to the whole buffer layer to adjust the hardness degree of the insole.

In one embodiment of the disclosure, when certain portion of the sole sustains more pressure, the deformation quantity will be increased, then can apply a thicker buffer layer or apply a layer with less hardness degree disposed at relatively bottom layer of the insole (or any layer of the insole) to achieve the decompression effect and re-distribute the pressure of the sole.

In step 150, the processor 20 obtains a sole projection plane according to the free foot type three-dimensional image.

In step 160, the processor 20 completes a designed insole according to a sole projection plane and the plantar deformation quantity.

Figure 7:
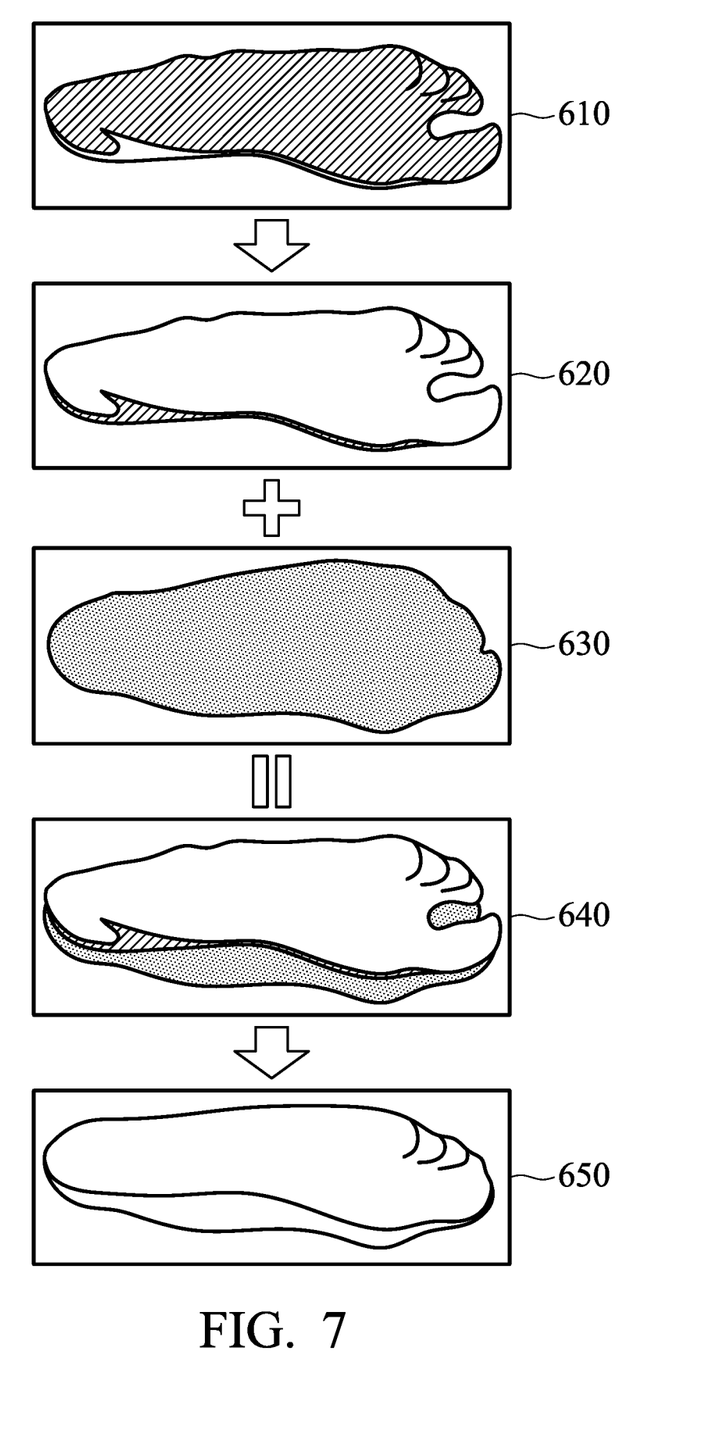
FIG. 7 is schematic diagram illustrating the three-dimensional model of the designed insole according to an embodiment of the present disclosure.

Please referring to FIG. 7, FIG. 7 is schematic diagram illustrating the three-dimensional model of the designed insole according to an embodiment of the present disclosure. In the embodiment shown in FIG. 7, due to the normal vector of the real plantar skin is upward (as shown in FIG. 4), when constructing the three-dimensional model file of the insole, the top portion of the insole of the three-dimensional model needs to match with the real sole. Therefore, in this embodiment, it needs to change the sign of the normal vector of the free foot model three-dimensional image 610, making the normal vector originally upward to be downward or the normal vector originally downward to be upward and the whole shape does not change. In other words, changing the sign of the normal vector can be understood as the concept of the rollover. Because when constructing the three-dimensional model file needs to define which one is the surface of the mold, it can define and distinguish the real foot and the surface of the three-dimensional insole model in the three-dimensional model file by this way.

Thus, after the processor 20 change the sign of the normal vector of the sole in the free foot model three-dimensional image 610, a free foot model three-dimensional image 620 is produced, and the free foot model three-dimensional image 620 can be viewed as the top of the three-dimensional insole model which is like the real sole having high and low fluctuations.

Then, setting the z-axis of the free foot model three-dimensional image 610 to be zero, and obtaining the three-dimensional profile of the bottom of the foot, which also is the projection of the sole to the ground. The projection is taken as the bottom of the three-dimensional insole model 630.

In one embodiment, if the insole is used to match a pair of shoes, then when getting the three-dimensional model file of the shoes, the three-dimensional profile of the sole is taken as the bottom of the three-dimensional insole model 630. Therefore, the bottom of the three-dimensional insole model 630 is not limited to be a plane, but also to be a curve plane.

In one embodiment, if the wearer's foot needs to be corrected, such as the sole of the foot has an internal rotation or an eversion, then the insole needs to do some angle adjustment. Under the assessment of a professional (such as a doctor), the degree of deflection of certain portions of the insole can be fine-tuned. More specifically specking, when changing the sign of the normal vector of the sole, the angle of the normal vector can be slightly adjusted. Moreover, the thickness of the bottom of the three-dimensional insole model can also be adjusted. In one embodiment, the fine-tuned insole model 640 contains the top of the fine-tuned three-dimensional insole model corresponding to the bottom of the fine-tuned three-dimensional insole.

In one embodiment, the processor 20 can completes a designed insole according to a sole projection plane or a three-dimensional profile of the specific sole and the plantar deformation quantity. In one embodiment, the processor 20 seals the free foot model three-dimensional image 620 and the bottom of the three-dimensional insole model 630, to form a three-dimensional model of the designed insole 650.

In one embodiment, the ways to implement the insole design method are various. Such as using computer aided design software to produce the three-dimensional model of the insole according to the above mentioned method of designing the shape, material and/or structure of the insole. And making out the insole by processing method such as 3D printing, CNC, etc.

The insole design method and the insole design system of the disclose can full shot the free foot model three-dimensional image and the pressed foot model three-dimensional image, and precisely aligning the free foot model three-dimensional image and the pressed foot model three-dimensional image to compute the difference quantity of the free foot model three-dimensional image and the pressed foot model three-dimensional image, which means the deformation quantity of the pressed sole. Then the personalized exclusive insole can be designed according to the deformation quantity of the pressed sole with the foot shape.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. An insole design method, comprising:
   capturing an uncompressed free foot model by a depth camera and obtaining a free foot model three-dimensional image;
   capturing a pressed foot model stepped on a transparent pedal by the depth camera and obtaining a pressed foot model three-dimensional image;

aligning the free foot model three-dimensional image with the pressed foot model three-dimensional image;

calculating and obtaining a plantar deformation quantity according to the aligned free foot model three-dimensional image and the aligned pressed foot model three-dimensional image; and completing a designed insole according to a sole projection plane or a three-dimensional profile of a specific sole and the plantar deformation quantity.

2. The insole design method of claim 1, wherein the step of aligning the free foot model three-dimensional image with the pressed foot model three-dimensional image further comprising:

rotating or moving the pressed foot model three-dimensional image to a z-axis plane having a z axis equal to zero, to produce the aligned pressed foot model three-dimensional image; and aligning an area of dorsum pedis of the free foot model three-dimensional image with an area of dorsum pedis of the pressed foot model three-dimensional image.

3. The insole design method of claim 2, wherein the step of rotating or moving the pressed foot model three-dimensional image to the z-axis plane, further comprises:

choosing three non-collinear points from a pressed area of the pressed foot model three-dimensional image, and rotating or moving the three non-collinear points to the z-axis plane.

4. The insole design method of claim 2, wherein the step of aligning the area of dorsum pedis of the free foot model three-dimensional image with the area of dorsum pedis of the pressed foot model three-dimensional image is using a rigid or non-rigid registration method to align, such as Iterative Closet Point, Robust Point Match, Kernel Correlation, Coherent Coint Drift, and Sorting the Correspondence Space algorithms to obtain a best solution.

5. The insole design method of claim 1, wherein the designed insole comprising a buffer layer, and the step of completing the designed insole according to the sole projection plane or the three-dimensional profile of the specific sole and the plantar deformation quantity comprises:

adjusting a thickness of the buffer layer according to the plantar deformation quantity.

6. The insole design method of claim 1, wherein the step of completing the designed insole according to the sole projection plane or the three-dimensional profile of the specific sole and the plantar deformation quantity comprises:

adjusting a material of the designed insole according to the plantar deformation quantity.

7. The insole design method of claim 1, wherein the three-dimensional profile of the specific sole is corresponding to a three-dimensional profile of a bottom of a specific shoe.

8. The insole design method of claim 1, wherein the sole projection plane is obtained according to a free foot type three-dimensional image.

9. An insole design system, comprises:

a depth camera configured to capture an uncompressed free foot model to obtain a free foot model three-dimensional image and capture a pressed foot model stepped on a transparent pedal to obtain a pressed foot model three-dimensional image; and a processor configured to align the free foot model three-dimensional image with the pressed foot model three-dimensional image, and obtain a plantar deformation quantity according to the aligned free foot model three-dimensional image and the aligned pressed foot model three-dimensional image, then complete a designed insole according to a sole projection plane or a three-dimensional profile of a specific sole and the plantar deformation quantity.

10. The insole design system of claim 9, wherein the processor further configured to rotate or move the free foot model three-dimensional image to a z-axis plane having a z axis equal to zero to produce the aligned free foot three-dimensional image, and align an area of dorsum pedis of the aligned free foot model three-dimensional image with an area of dorsum pedis of the aligned pressed foot model three-dimensional image.

11. The insole design system of claim 10, wherein the processor further configured to choose three non-collinear points from a pressed area of the pressed foot model three-dimensional image, and rotating or moving the three non-collinear points to the z-axis plane.

12. The insole design system of claim 10, wherein the processor aligns the images by processing Iterative Closet Point, Robust Point Match, Kernel Correlation, Coherent Coint Drift, or Sorting the Correspondence Space algorithms to obtain a best solution.

13. The insole design system of claim 9, wherein the designed insole comprises a buffer layer, and the processor further configured to adjust a thickness of the buffer layer according to the plantar deformation quantity.

14. The insole design system of claim 9, wherein when the processor completes the designed insole according to the sole projection plane or the three-dimensional profile of the specific sole and the plantar deformation quantity, the processor further adjust a material of the designed insole according to the plantar deformation quantity.

15. The insole design system of claim 9, wherein the sole projection plane is obtained according to a free foot type three-dimensional image.

16. The insole design system of claim 9, wherein the three-dimensional profile of the specific sole is obtained corresponding to a three-dimensional profile of a bottom of a specific shoe.

* * * * *